US010230450B2

(12) United States Patent
Kim et al.

(10) Patent No.: US 10,230,450 B2
(45) Date of Patent: Mar. 12, 2019

(54) METHOD FOR CONTROLLING HAND-OVER IN DRONE NETWORK

(71) Applicant: KOREA UNIVERSITY RESEARCH AND BUSINESS FOUNDATION, Seoul (KR)

(72) Inventors: Hwang Nam Kim, Seoul (KR); Seung Ho Yoo, Seoul (KR); Kang Ho Kim, Busan (KR); Albert Yong Joon Chung, Seoul (KR); Ji Yeon Lee, Yongin-si (KR); Suk Kyu Lee, Seoul (KR); Jong Tack Jung, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 561 days.

(21) Appl. No.: 14/709,226

(22) Filed: May 11, 2015

(65) Prior Publication Data
US 2015/0327136 A1    Nov. 12, 2015

(30) Foreign Application Priority Data

May 12, 2014  (KR) .................. 10-2014-0056629
Feb. 26, 2015  (KR) .................. 10-2015-0027439

(51) Int. Cl.
*H04B 7/185*  (2006.01)
*H04L 29/08*  (2006.01)
(Continued)

(52) U.S. Cl.
CPC ......... *H04B 7/18504* (2013.01); *H04L 67/12* (2013.01); *H04W 36/03* (2018.08);
(Continued)

(58) Field of Classification Search
CPC ..... H04W 36/08; H04W 36/03; H04W 84/06; H04L 67/12; H04B 7/18504; B64C 2201/122
See application file for complete search history.

(56) References Cited

U.S. PATENT DOCUMENTS 8,565,689 B1 * 10/2013 Rubin .................. G06F 11/00
                                                    370/232
8,831,524 B2 *  9/2014 Milner ................ H04W 24/02
                                                    370/256
(Continued)

FOREIGN PATENT DOCUMENTS

JP    2002-325275 A    11/2002
KR   10-2009-118033 A  11/2009
KR   10-2013-0010409 A  1/2013

OTHER PUBLICATIONS

P. Bupe Jr, R. Haddad and F. Rios-Gutierrez, "Relief and Emergency Communication Network Based on an Autonomous Decentralized UAV Clustering Network," In Proc. IEEE Southeast Conf., Apr. 9-12, 2015.*

*Primary Examiner* — Peter D Nolan
(74) *Attorney, Agent, or Firm* — Novick, Kim & Lee, PLLC; Sang Ho Lee (57) ABSTRACT

The present invention relates to a method for controlling hand-over in a drone network. A method for controlling hand-over in a drone network that is established by a plurality of drones that constitute a formation, and controlled by a ground control station (GCS) that controls the location, configuration and mobility of each of the plurality of drones according to the present invention includes a phase via which the GCS predicts, based on previously stored control information, a drone that is to be newly deployed or transferred from another formation and allocates network connection information to the drone thus predicted; a phase (Continued)

via which the GCS generates a virtual routing table including the drone that is thus predicted to be deployed or transferred; a phase via which the GCS, upon actual deploying or transferring the predicted drone, changes the virtual routing table into an actual routing table; and a phase via which the GCS, upon the drone thus deployed or transferred transmitting a control message of the formation routing protocol, calibrates and optimizes the routing table.

18 Claims, 7 Drawing Sheets

(51) Int. Cl.
*H04W 36/08* (2009.01)
*H04W 36/00* (2009.01)
*H04W 84/06* (2009.01)

(52) U.S. Cl.
CPC ....... *H04W 36/08* (2013.01); *B64C 2201/122* (2013.01); *H04W 84/06* (2013.01)

(56) References Cited

U.S. PATENT DOCUMENTS

| | | | | |
|---|---|---|---|---|
| 8,897,770 B1* | 11/2014 | Frolov | H04B 7/18504 | 244/25 |
| 8,983,455 B1* | 3/2015 | Frolov | H04B 7/18504 | 244/25 |
| 9,031,511 B2* | 5/2015 | Rubin | H04L 1/1861 | 455/513 |
| 9,083,425 B1* | 7/2015 | Frolov | H04B 7/18504 | |
| 9,137,675 B2* | 9/2015 | Rubin | H04W 16/28 | |
| 9,144,082 B2* | 9/2015 | Rubin | H04W 72/12 | |
| 9,179,352 B2* | 11/2015 | Rubin | H04W 28/021 | |
| 9,179,392 B2* | 11/2015 | Rubin | H04J 11/005 | |
| 9,219,541 B2* | 12/2015 | Rubin | H04B 7/26 | |
| 9,253,696 B2* | 2/2016 | Rubin | G06F 11/00 | |
| 9,302,782 B2* | 4/2016 | Frolov | B64C 39/02 | |
| 9,311,198 B2* | 4/2016 | Rubin | G06F 11/00 | |
| 9,578,574 B2* | 2/2017 | Rubin | | |
| 9,596,020 B2* | 3/2017 | Frolov | H04B 7/18504 | |
| 9,621,254 B2* | 4/2017 | Chang | H04B 7/18506 | |
| 9,654,200 B2* | 5/2017 | Mazzarella | H04B 7/18504 | |
| 9,843,973 B2* | 12/2017 | Rubin | H04W 36/18 | |
| 9,924,550 B2* | 3/2018 | Reynaud | H04W 24/04 | |
| 10,003,397 B2* | 6/2018 | Mazzarella | H04W 4/90 | |
| 2002/0155830 A1* | 10/2002 | Iyer | H04L 41/12 | 455/423 |
| 2004/0102191 A1* | 5/2004 | Pewitt | H04B 7/18504 | 455/431 |
| 2013/0017796 A1* | 1/2013 | Milner | H04W 24/02 | 455/67.13 |
| 2013/0336174 A1* | 12/2013 | Rubin | H04W 16/28 | 370/280 |
| 2013/0336176 A1* | 12/2013 | Rubin | H04B 7/26 | 370/280 |
| 2013/0336179 A1* | 12/2013 | Rubin | H04W 72/046 | 370/281 |
| 2013/0337822 A1* | 12/2013 | Rubin | H04W 72/12 | 455/452.1 |
| 2014/0003394 A1* | 1/2014 | Rubin | G06F 15/16 | 370/331 |
| 2014/0056224 A1* | 2/2014 | Rubin | H04W 28/021 | 370/328 |
| 2014/0153402 A1* | 6/2014 | Rubin | H04J 11/005 | 370/238 |
| 2014/0241239 A1* | 8/2014 | Chang | H04B 7/18506 | 370/316 |
| 2015/0133073 A1* | 5/2015 | Mitchell | H04W 4/22 | 455/404.1 |
| 2015/0244451 A1* | 8/2015 | Baeckman | F42B 12/365 | 455/427 |
| 2015/0301912 A1* | 10/2015 | Rubin | G06F 15/16 | 714/4.11 |
| 2015/0332523 A1* | 11/2015 | Ranasinghe | H04W 24/10 | 701/34.2 |
| 2015/0334768 A1* | 11/2015 | Ranasinghe | H04W 24/10 | 370/328 |
| 2016/0046387 A1* | 2/2016 | Frolov | B64C 39/02 | 244/59 |
| 2016/0050011 A1* | 2/2016 | Frolov | H04B 7/18506 | 455/431 |
| 2016/0050012 A1* | 2/2016 | Frolov | H04B 7/18504 | 455/431 |
| 2016/0050075 A1* | 2/2016 | Rubin | H04B 7/26 | 455/408 |
| 2016/0156406 A1* | 6/2016 | Frolov | H04B 7/18504 | 455/431 |
| 2016/0174121 A1* | 6/2016 | Rubin | G06F 15/16 | 370/331 |
| 2017/0250749 A1* | 8/2017 | Mazzarella | H04W 4/90 | |
| 2018/0063762 A1* | 3/2018 | Rubin | H04L 65/1063 | |

\* cited by examiner

METHOD FOR CONTROLLING HAND-OVER IN DRONE NETWORK

TECHNICAL FIELD

The present invention relates to a method for controlling hand-over in a drone network, and more specifically, to a method for controlling hand-over in a drone network which form a network particularly in the air and in which users as well as drones are frequently replaced, deployed or transferred.

BACKGROUND ART

This invention was supported by Samsung Research Funding Center of Samsung Electronics under Project Number SRFC-IT1401-09.

Hand-over, extensively employed in mobile telecommunications, is an essential technology to continuously provide users with services in a network that experience frequent changes. In short, hand-over is used in a cellular network to provide users with continuous communication. For example, hand-over occurs when a base station that is connected with a mobile station is changed because the wireless channel status in the base station is at fault or the mobile station moves from a base station area to another base station network, wherein although the user moves, the base station, installed on the ground, has a fixed cellular network.

Hand-over is also used to continuously provide a WLAN such as WiFi, for which the APs (access points) of all the WLANs have been operated in NAT (network address translation) mode and virtual router technology has been introduced to provide mobile telecommunications only by WLANs by overlapping the APs like mobile telecommunications base stations. An AP, however, has a diameter of about 20 to 30 m only, which is not very practical making the service available only in an area where there is a large transient population with also a significant number of APs installed.

As thus far described, hand-over that occurs in a cellular network or WLAN takes into consideration only the mobility of users with base stations or APs fixed as well as an service area also fixed, wherein the base stations are fixed on the ground with no mobility while environments such as power supply are stable, which means almost no change in the network.

A drone network that provides users with its services under special conditions, where frequently drones are replaced or drones moves in formation depending on whether there is a user or according to the drone status, is not conformable to such existing hand-over technology. In other words, no hand-over technology has ever been developed to provide stable network services under a condition that the network is configured in the air and per se highly mobile.

DISCLOSURE OF INVENTION

Technical Problem

Correspondingly, the present invention provides a method for controlling hand-over that provides stable network services in a drone network in which users as well as drones are frequently replaced or transported.

In addition, the present invention provides, when drone formations have been configured in order to establish a drone network, a method for controlling hand-over that reduces network loads when a new drone is deployed to a specific formation or a drone of a specific formation moves to another formation.

Moreover, the present invention provides, when drone formations have been configured in order to establish a drone network, a method for controlling hand-over that reduces network loads when a specific drone is replaced by a new drone.

Furthermore, the present invention provides, when a specific mobile station moves to the service area of another drone due to the movement of drones or mobile stations in a drone network, a method for controlling hand-over that reduces hand-over loads.

Technical Solution

To achieve the objectives, a method for controlling hand-over in a drone network according to Embodiment 1 of the present invention that is established by a plurality of drones that constitute a formation, and controlled by a ground control station (GCS) that controls the location, configuration and mobility of each of the plurality of drones includes a phase via which the GCS predicts, based on previously stored control information, a drone that is to be newly deployed or transferred from another formation and allocates network connection information to the drone thus predicted; a phase via which the GCS generates a virtual routing table including the drone that is thus predicted to be deployed or transferred; a phase via which the GCS, upon actual deploying or transferring the predicted drone, changes the virtual routing table into an actual routing table; and a phase via which the GCS, upon the drone thus deployed or transferred transmitting a control message of the formation routing protocol, calibrates and optimizes the routing table.

Preferably, in the virtual routing table generation phase, a routing table is generated based on either a simulation or a mathematical model.

Also preferably, in the virtual routing table generation phase, the drone generates a virtual routing table by receiving, from the GCS, the information of the drone thus predicted to be deployed or transferred in order to generate a virtual routing table.

To achieve the objectives, a method for controlling hand-over in a drone network according to Embodiment 2 of the present invention that is established by a plurality of drones that constitute a formation, and controlled by a ground control station (GCS) that controls the location, configuration and mobility of each of the plurality of drones includes a phase via which the GCS collects information from the plurality of drones that constitute a formation and monitors in real time malfunctions or battery status of each of the plurality of drones; a phase via which, upon finding a defective drone with malfunctions or inadequate battery capacity based on the monitoring activities, the GCS transfers a substitute drone that is to replace the defective drone to the defective drone location; and a phase via which the GCS copies the network information of the defective drone onto the substitute drone.

Preferably, in the substitute drone transferring phase, the GCS verifies whether the defective drone can make a flight and, if the defective drone cannot make a flight, controls the defective drone to allocate in advance, before being replaced, the network information of the defective drone to the substitute drone.

Also preferably, in the network information copying phase, the GCS receives from the defective drone the network information thereof and transfers the network information to the substitute drone.

Preferably, in the network information copying phase, the GCS controls, via telemetry or a communication protocol, the defective drone to transfer the network information of the defective drone directly to the substitute drone.

Also preferably, the network information copying phase includes a phase via which the GCS controls the substitute drone to allocate an arbitrary ID for peer-to-peer communications to the defective drone; and a phase via which the GCS controls the defective drone to communicate with the substitute drone using the arbitrary ID thus allocated.

Preferably, the network information copying phase includes a phase via which the GCS controls the defective drone to provide services without an interruption during the copying activities; and a phase via which the GCS controls the defective drone to store the packets received and transmitted during the copying activities in the cache of the defective drone.

Preferably, the network information copying phase additionally includes a phase via which the GCS controls the substitute drone, after the copying activities are completed, to receive the packets stored in the cache of the defective drone in order to restore messages lost or retransmit the packets to an adjacent drone.

Also preferably, in the network information copying phase, the GCS controls, if the defective drone cannot transfer the information of the defective drone to the substitute drone, the network information of the defective drone stored in the GCS or an adjacent drone to be transferred to the substitute drone.

To achieve the objectives, a method for controlling hand-over in a drone network according to Embodiment 3 of the present invention that is established by a plurality of drones that constitute a formation, and controlled by a ground control station (GCS) that controls the location, configuration and mobility of each of the plurality of drones includes a phase via which the GCS schedules the movement information of the drones; and a phase via which the GCS controls, if Drone 1 is to be deviated from a specific area where Drone 1 has been providing services, the user certification information in the specific area as well as the network information of Drone 1 to be transferred to Drone 2 that is to provide services in the specific area.

Preferably, the method for controlling hand-over in a drone network additionally includes a phase via which the GCS predicts the direction in which a mobile station is to move; and a preprocessing phase via which the GCS shares, if the mobile station is predicted to make an excursion from the area the current drone covers, network information with a drone which resides in the area the mobile station is predicted to move in.

Advantageous Effects of Invention

A method for controlling hand-over in a drone network the present invention provides predicts changes regarding drones in a drone network in which users as well as drones are frequently replaced, deployed or transferred depending on the condition in order to minimize the overheads incurred by network setting and routing information update. Therefore, the present invention secures prompt and exact hand-over and provides stable network services.

DESCRIPTION OF DRAWINGS

FIG. 1 is a general system configuration diagram illustrating a drone network the present invention is established to.

FIG. 2 is a schematic diagram that exemplifies a case where a drone is newly transferred or deployed from the exterior of a drone network the present invention is established to.

FIG. 6 is a schematic diagram illustrating a case where a drone moves in a drone network the present invention is established to.

FIG. 7 is a schematic diagram illustrating a case where a user moves in a drone network the present invention is established to.

MODE FOR INVENTION

Although the present invention may be modified in various ways and have diverse embodiments, a few specific embodiments will be described in detail with reference to accompanying drawings. The present invention, however, is not limited to the specific embodiments, and must be interpreted to include all the modifications and equivalents within the technical thoughts and scope of the present invention. Similar elements are referred to with reference numerals also similar to each other.

Although such terms as (Embodiment) 1, (Embodiment) 2, A, B, etc. may be used to designate various elements of the present invention, the elements must not be limited thereto. The terms should be introduced only in order to differentiate an element from another element. For example, within the scope of the present invention, Element 1 may be designated also as Element 2 and, correspondingly, vice versa. The term and/or includes any certain item of either a plurality of related and listed items or combinations of the plurality of related and listed items.

An element described as "(being) connected" or "(being) wired" to another element should be interpreted, although the former may be directly connected or wired to the latter, to have a third element in between. On the contrary, an element described as "(being) directly connected" or "(being) directly wired" to another element should be interpreted to have no other element in between.

Terms entered in this Specification are to describe specific embodiments, not to limit the present invention thereto. A term in the singular form includes, unless the term otherwise specifies an obviously different concept, the plural form thereof.

"include/includes/including/included", "have/has/having/had", etc. entered in this Specification is to specify that there exists a feature, number, phase, activity, component or part or a combination thereof, not to exclude in advance any possibility that there exist or add up one or more other features, numbers, phases, activities, components or parts or combinations thereof.

Unless otherwise defined, any term, including technological or scientific one, used in this Specification has a meaning identical to that an ordinary person skilled in the art typically recognizes. Any term in this Specification, which is listed and defined in a dictionary referred to in common, should be interpreted to have a meaning identical to that used in the context of related technology, and unless otherwise clearly defined in this Specification, should be interpreted as neither ideal nor formal to an excessive extent.

Preferred embodiments according to the present invention will now be described with reference to accompanying drawings. If it is stated in the entire Specification and Claims thereof that a certain section includes a certain element, the statement should, unless otherwise specified to the contrary, not exclude but may include other elements.

Figure 1:
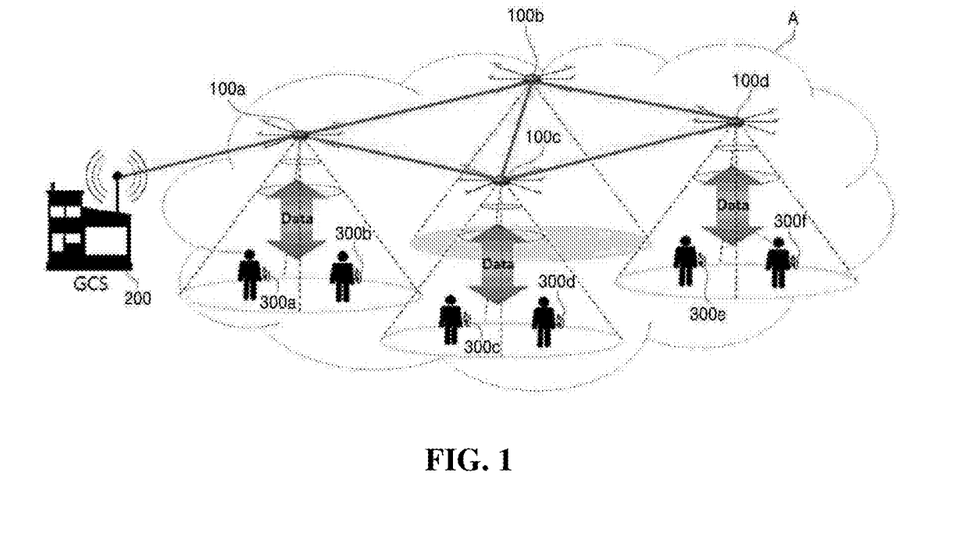

FIG. 1 is a general system configuration diagram illustrating a drone network the present invention is established to. As illustrated in FIG. 1, a drone network the present invention is applied to comprises and includes a plurality of drones $100a$, $100b$, $100c$, and $100d$ that are controlled by a GCS (ground control station) 200 and constitutes a formation, wherein the plurality of drones $100a$, $100b$, $100c$, and $100d$ provide mobile stations $300a$, $300b$, $300c$, $300d$, $300e$, and $300f$ located in the area each of the drones covers with network services. In this regard, a drone refers to all the flying objects with no person aboard, including unmanned airships and unmanned flying objects that are remote-controlled or fly according to predetermined information. A drone formation refers to a group of drones that implement missions in cooperation with each other for a larger responsibility. A drone formation may accomplish a hard mission a single drone alone may not accomplish with ease by controlling the drones at the formation, not a single object, level. In the exemplification of FIG. 1, the four drones $100a$, $100b$, $100c$, and $100d$ constitute a formation and provide network services under the control of the GCS 200.

Figure 2:
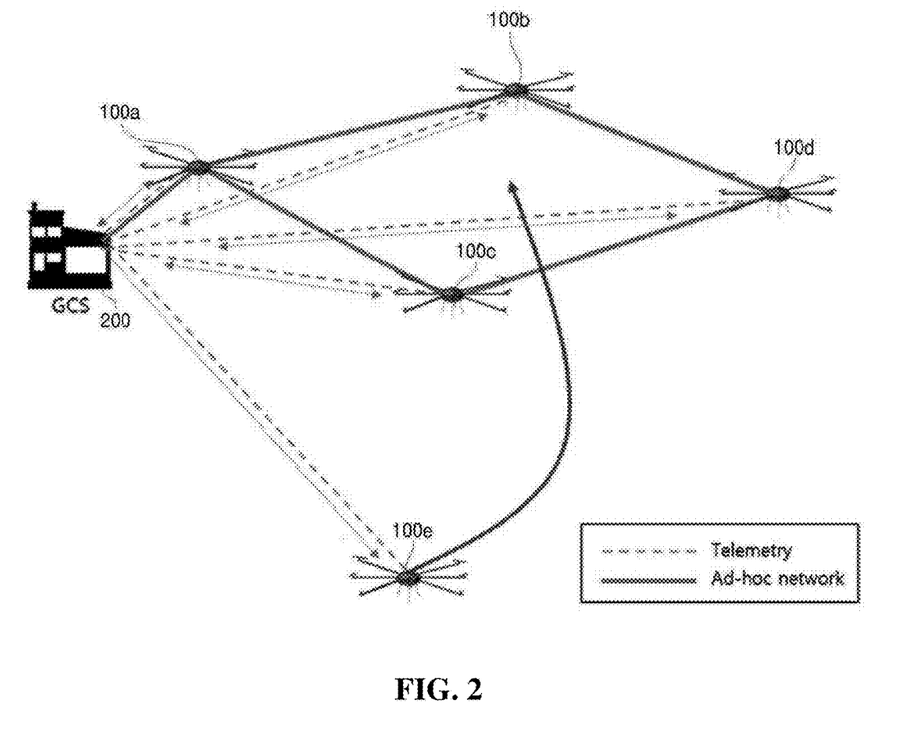

FIG. 2 a schematic diagram that exemplifies a case where a drone is newly transferred or deployed from the exterior of a drone network the present invention is established to. As illustrated in FIG. 2, the present invention relates to a GCS 200 controlling method in case that a drone $100e$ is to be added to an existing drone network of a formation of four drones $100a$, $100b$, $100c$, and $100d$ that provide network services under the control of the GCS 200. For example, in order to additionally include the drone $100e$, the GCS 200 should preliminarily save existing network information such as routing tables in the extra drone $100e$ and make the existing drones $100a$, $100b$, $100c$, and $100d$ recognize the existence of the extra drone $100e$ as well as the network information pertinent to it. Such a processing of the GCS 200 will be described in each embodiment.

Figure 3:
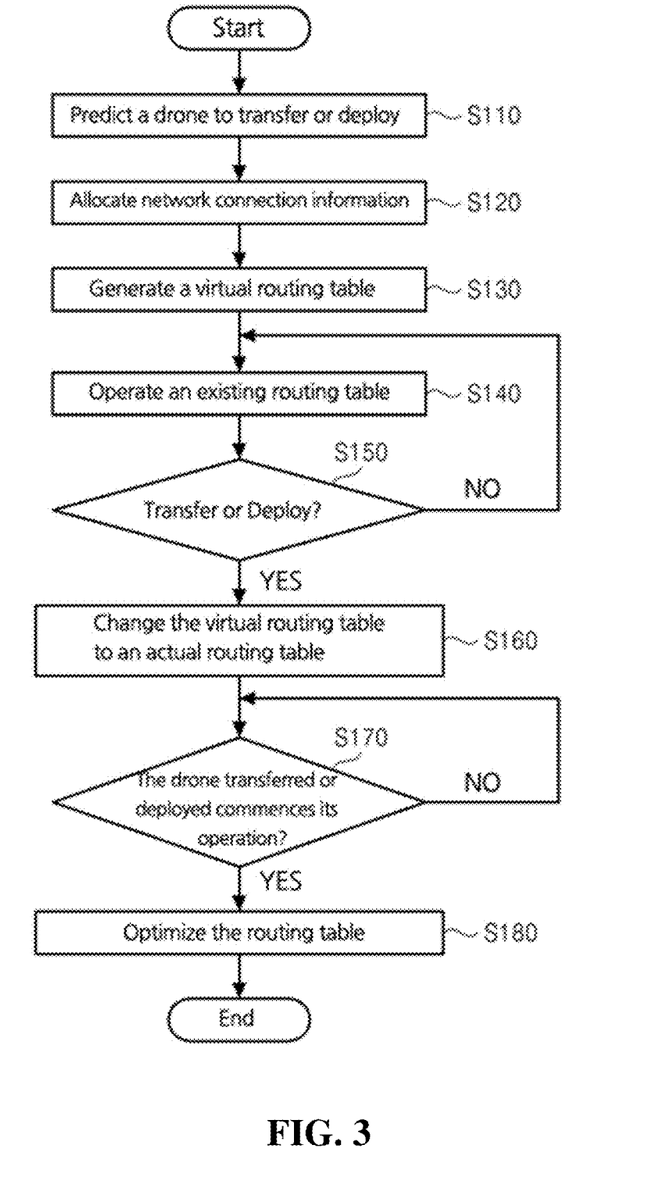
FIG. 3 is a process flow chart of a method for controlling hand-over in a drone network according to Embodiment 1 of the present invention.

FIG. 3 is a process flow chart of a method for controlling hand-over in a drone network according to Embodiment 1 of the present invention. More specifically, FIG. 3 describes the case that a drone that has been operated in another network is to be transferred to or a new drone is to be deployed to an existing drone network. With reference to FIGS. 2 and 3, a method for controlling hand-over in a drone network according to Embodiment 1 of the present invention is as follows.

At first, in Phase S110, the GCS 200 predicts whether there exists a drone $100e$ that is newly transferred or deployed to an existing network. In other words, the GCS 200 predicts whether a drone that has been in another network is to be transferred or a new drone is to be deployed.

In Phase S120, the GCS 200 allocates, in case that there exists the drone $100e$ to be transferred or deployed, network connection information to the drone $100e$.

In Phase S130, the GCS 200 registers the drone $100e$ to be transferred or deployed in an existing network. In other words, the GCS 200 generates a virtual routing table including the drone $100e$ to be transferred or deployed. For this purpose, the GCS 200 may be required to generate a routing table based on a simulation or mathematical model. Meanwhile, the routing table may be distributedly generated by the drones that constitute the existing network of the drone $100e$ to be transferred or deployed based on the network information the GCS 200 provides.

In Phases S140 and S150, the GCS operates an existing routing table while the GCS verifies whether a new drone is to be transferred or deployed because it is presumed in the virtual routing table that a new drone that has not yet been involved will participate.

In Phase S160, the GCS 200 changes, when a new drone is transferred or deployed, the virtual routing table into an actual routing table. In other words, the GCS 200 operates the network based on the content of the virtual routing table.

In Phase S170, the GCS 200 determines whether the drone that has been deployed or transferred commences to transmit a control message of the formation routing protocol.

In Phase S180, the GCS calibrates and optimizes the routing table if the GCS determines that the drone deployed or transferred commenced to transmit a control message of the formation routing protocol.

Figure 4:
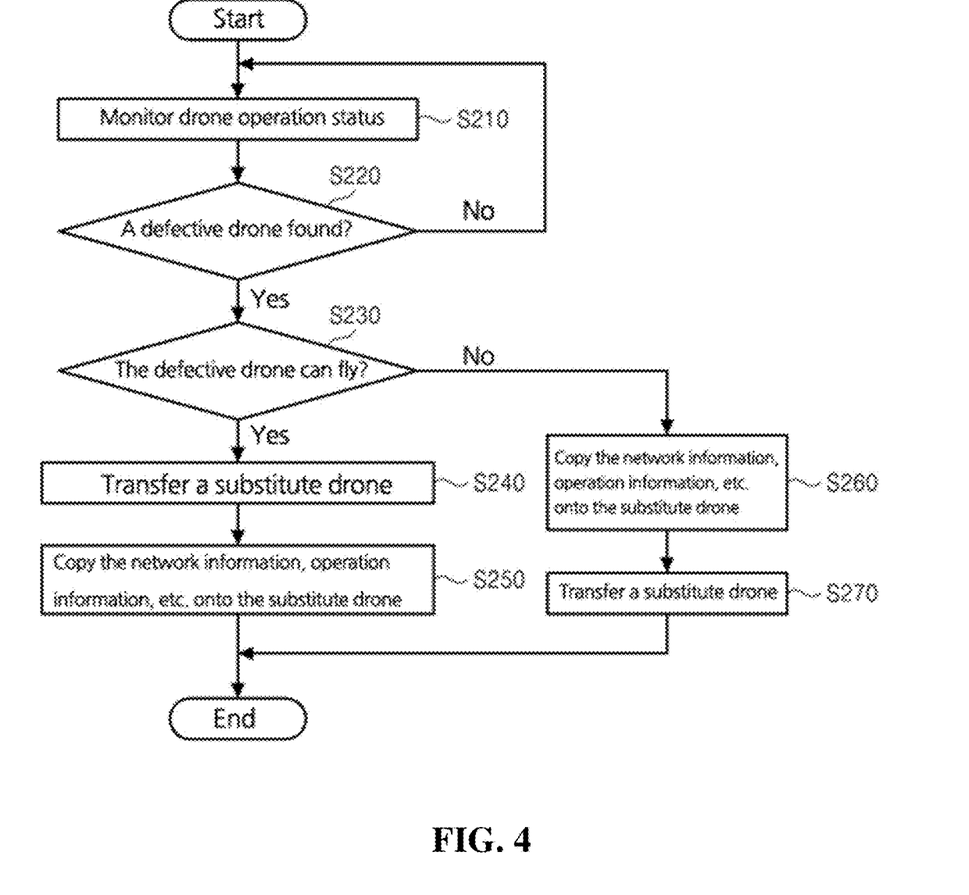
FIG. 4 is a process flow chart of a method for controlling hand-over in a drone network according to Embodiment 2 of the present invention.

FIG. 4 is a process flow chart of a method for controlling hand-over in a drone network according to Embodiment 2 of the present invention. FIG. 4 describes an exemplification that replaces, if a drone is determined to be a defective drone with malfunctions or battery problems, the defective drone by another drone. As illustrated in FIGS. 2 and 4, a method for controlling hand-over in a drone network according to Embodiment 2 of the present invention is as follows.

In Phase S210, a GCS 200 collects information from a plurality of drones that constitute a formation and monitors in real time malfunctions or battery status of each of the plurality of drones.

In Phase S220, the GCS 200 determines, based on the monitoring activities, whether a defective drone has been found with malfunctions or in adequate battery capacity.

In Phase S230, the GCS 200 determines, upon finding a defective drone, whether the defective drone is able to make a flight in order to precautionarily meet a serious situation that the defective drone is not even able to make a flight.

In Phase S240, if the defective drone can make a flight, the GCS 200 transfers a substitute drone to the location of the defective drone.

In Phase S250, the GCS 200 copies the network information of the defective drone onto the substitute drone. For this purpose, the GCS 200 may receive from the defective drone the network information thereof and transfer the network information to the substitute drone, or control, via telemetry or a communication protocol, the defective drone to transfer the network information of the defective drone directly to the substitute drone. If the defective drone cannot transfer the information of the defective drone to the substitute drone, the network information of the defective drone stored in the GCS 200 or an adjacent drone may be controlled to be transferred to the substitute drone. In addition, the GCS 200 may control the substitute drone to allocate an arbitrary ID for peer-to-peer communications to the defective drone so that the defective drone may communicate with the substitute drone using the ID. Meanwhile, the GCS 200 may control the defective drone to provide services without an interruption during the copying activities and the packets received and transmitted during the copying activities to be stored in the cache of the defective drone so that the substitute drone, after the copying activities are completed, may receive the packets stored in the cache of the defective drone in order to restore messages lost or retransmit the packets to an adjacent drone.

In Phase S260, if the defective drone is not able to make a flight, the GCS 200 preliminarily allocates, before transferring the substitute drone, the networking information of the defective drone to the substitute drone as the GCS 200 did in Phase S250, and in Phase S270, transfers the substitute drone that preliminarily stores the network information of the defective drone to the location of the defective drone.

Figure 5:
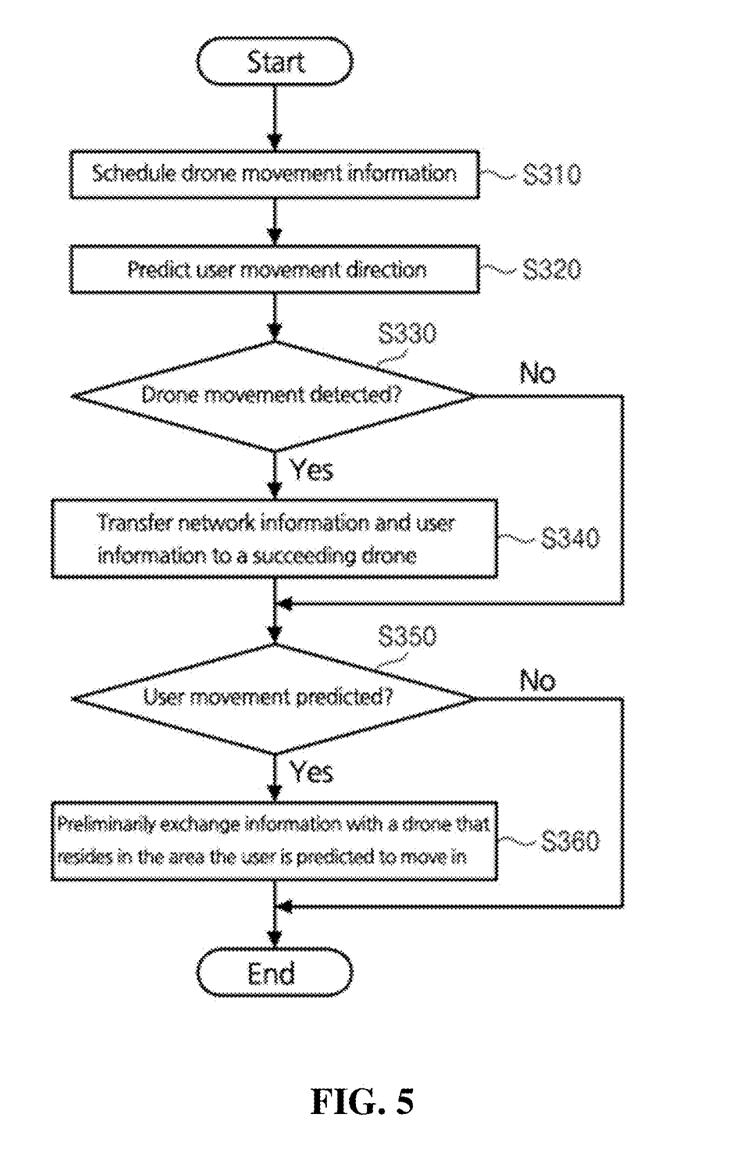
FIG. 5 is a process flow chart of a method for controlling hand-over in a drone network according to Embodiment 3 of the present invention.

FIG. 5 is a process flow chart of a method for controlling hand-over in a drone network according to Embodiment 3 of the present invention. In other words, FIG. 5 describes an exemplification of a method for maintaining data communications, if a drone or a user involved in an existing drone network changes the location, correspondingly by transferring the network information to a succeeding drone. As illustrated in FIGS. 2 and 5, a method for controlling hand-over in a drone network according to Embodiment 3 of the present invention is as follows.

In Phase S310, a GCS 200 schedules the movement information of the drones and, in Phase S320, predicts the direction in which a user is to move.

In Phase S330, the GCS 200 determines whether a drone is to move.

Figure 6:
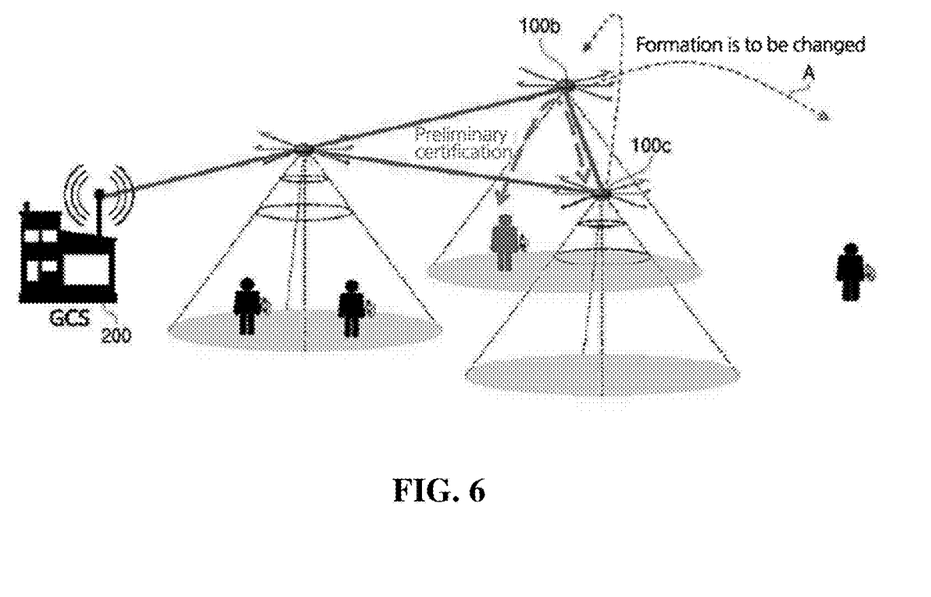

In Phase S340, if a drone is determined to move, or Drone 1 is to be deviated from a specific area where Drone 1 has been providing services, the GCS 200 controls the user certification information in the specific area as well as the network information of Drone 1 to be transferred to Drone 2 that is to provide services in the specific area. In other words, the GCS 200 controls Drone 2 that is to substitute for Drone 1 and provide the specific area with network services to store the information of Drone 1. FIG. 6 is a schematic diagram illustrating a case where a drone moves in a drone network the present invention is established to. As illustrated in FIG. 6, if Drone 1 100*b* that has constituted a formation and provided network services moves to another area (A), Drone 2 100*c* that also constitutes the formation should cover the area Drone 1 has once covered and continue to provide the area with network services. In short, in Phase S340, the GCS 200 controls Drone 2 to succeed the network information of Drone 1.

In Phase S350, the results of the user movement prediction is determined.

Figure 7:
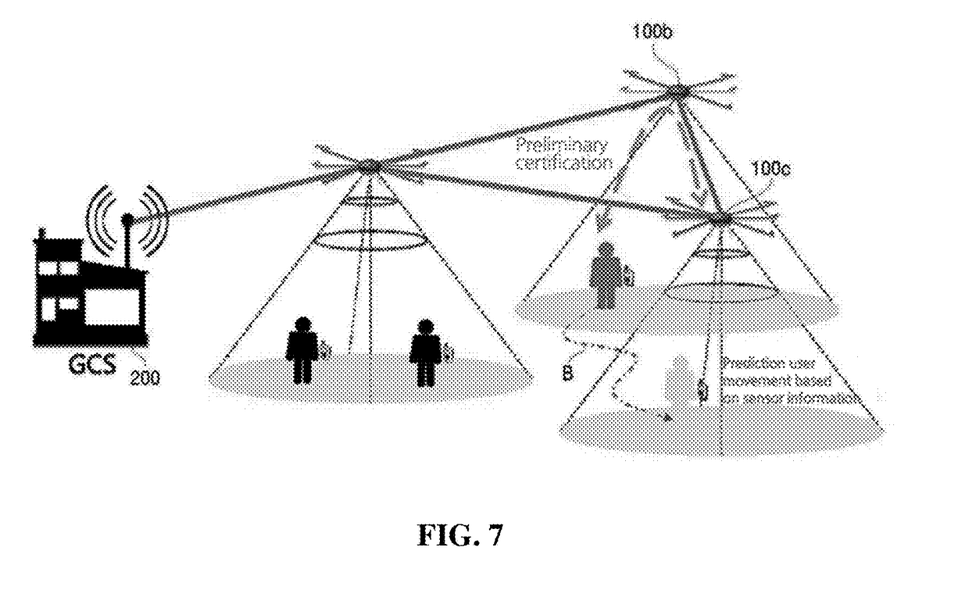

In Phase S360, if a user is predicted to move, or if a mobile station is predicted to make an excursion from the area the current drone covers, the GCS 200 shares network information with a drone which resides in an area the mobile station is predicted to move in. For example, the GCS 200 transfers the network information of a mobile station to a drone that resides in the area in which the mobile station is predicted to move. FIG. 7 is a schematic diagram illustrating a case where a user moves in a drone network the present invention is established to. As illustrated in FIG. 7, if a user who has been in the area Drone 1 100*b* covers moves in the area Drone 2 100*c* covers (B), the GCS 200 should provides Drone 2 100*c* with the network information of the user Drone 1 100*b* has controlled. In short, in Phase S360, the GCS 200 shares user network information with a drone that resides in the area in which the user is predicted to move.

The description with reference to the accompanying drawings is to detail embodiments of the present invention and the present invention must not be limited to the exemplification based on FIGS. 1 through 5. For example, although the exemplification based on FIG. 5 illustrates that a phase (S330) that detects drone movement and another phase (S350) that predicts user movement are consecutively practiced, the description, constituting an embodiment to clarify such phases, must not limit the present invention to the details of the exemplification of FIG. 5. In other words, phases (S330 and S340) that detect and correspondingly transfer user information and the rest phases (S350 and S360) that predict user movement and correspondingly preliminarily exchange information may be practiced either consecutively, as illustrated in the related figure, or simultaneously in parallel.

Meanwhile, the embodiments thus specified of the present invention may be prepared by an application that is operated in a computer, and established by a general-purpose digital computer set that operates the application using a recording medium that is read in a computer.

The recording medium that is read in a computer includes a magnetic storage such as ROM, floppy disc, hard disc, etc. and an optical storage such as CD-ROM, DVD, etc.

The present invention has thus far been specified emphasizing the preferred embodiments. A person skilled in the art of the present invention may recognize that the present invention may be established with a certain modification to an extent that within the essential features of the present invention. Therefore, embodiments thus far disclosed must be considered explicative, not definitive. The scope of the present invention is specified in Claims, not in description thus far detailed while all the differences within an equivalent scope must be interpreted to be included in the present invention.

The invention claimed is:

1. A method for controlling hand-over in a drone network that is established by a plurality of drones that constitute a formation, wherein the drone network is controlled by a ground control station (GCS) that controls the location, configuration and mobility of each of the plurality of drones, the method comprising
    a phase via which the GCS collects information from the plurality of drones that constitute the formation and monitors in real time each of the plurality of drones;
    a phase via which, upon finding a drone to be changed with necessity of replacement based on the monitoring activities, the GCS transfers a substitute drone that is to replace the drone to be changed to a location of the drone to be changed; and
    a phase via which the GCS copies network information of the drone to be changed onto the substitute drone, wherein, in the network information copying phase, the GCS receives from the drone to be changed the network information thereof and transfers the received network information to the substitute drone.

2. The method for controlling hand-over in a drone network of claim 1, wherein, in the substitute drone transferring phase, the GCS verifies whether the drone to be changed can make a flight and, if the drone to be changed cannot make the flight, controls the drone to be changed to allocate in advance, before being replaced, the network information of the drone to be changed to the substitute drone.

3. The method for controlling hand-over in a drone network of claim 1, wherein the network information copying phase includes:
    a phase via which the GCS controls the drone to be changed to provide services without an interruption during the copying activities; and
    a phase via which the GCS controls the drone to be changed to store packets received and transmitted during the copying activities in a cache of the drone to be changed.

4. The method for controlling hand-over in a drone network of claim 3, wherein the network information copying phase further includes a phase via which the GCS controls the substitute drone, after the copying activities are completed, to receive the packets stored in the cache of the drone to be changed in order to restore messages lost or to retransmit the packets to an adjacent drone.

5. The method for controlling hand-over in a drone network of claim 1, wherein, in the network information copying phase, if the drone to be changed cannot transmit the network information of the drone to be changed to the GCS, the GCS controls the network information of the drone to be changed stored in the GCS or in an adjacent drone to be transferred to the substitute drone.

6. The method for controlling hand-over in a drone network of claim 1, wherein, in the network information copying phase, if the GCS cannot copy the network information of the drone to be changed onto the substitute drone, the method for controlling hand-over in a drone network further includes:
 a phase via which the GCS generates a virtual routing table including the substitute drone;
 a phase via which the GCS, upon actual replacing of the drone to be changed with the substitute drone, changes the virtual routing table into an actual routing table; and
 a phase via which the GCS, upon the substitute drone thus replaced transmitting a control message of a formation routing protocol, calibrates and optimizes the actual routing table.

7. The method for controlling hand-over in a drone network of claim 6, wherein, in the virtual routing table generation phase, the virtual routing table is generated based on either a simulation or a mathematical model.

8. The method for controlling hand-over in a drone network of claim 6, wherein, in the virtual routing table generation phase, the substitute drone generates the virtual routing table by receiving, from the GCS, the information of the substitute drone thus replaced in order to generate the virtual routing table.

9. The method for controlling hand-over in a drone network of claim 1, wherein the network information copying phase includes:
 a phase via which the GCS controls the substitute drone to allocate an arbitrary ID for peer-to-peer communications with the drone to be changed; and
 a phase via which the GCS controls the drone to be changed to communicate with the substitute drone using the arbitrary ID thus allocated.

10. A method for controlling hand-over in a drone network that is established by a plurality of drones that constitute a formation, wherein the drone network is controlled by a ground control station (GCS) that controls the location, configuration and mobility of each of the plurality of drones, the method comprising
 a phase via which the GCS collects information from the plurality of drones that constitute the formation and monitors in real time each of the plurality of drones;
 a phase via which, upon finding a drone to be changed with necessity of replacement based on the monitoring activities, the GCS transfers a substitute drone that is to replace the drone to be changed to a location of the drone to be changed; and
a phase via which the GCS copies network information of the drone to be changed onto the substitute drone, wherein, in the network information copying phase, the GCS controls, via telemetry or a communication protocol, the drone to be changed to transfer the network information of the drone to be changed directly to the substitute drone.

11. The method for controlling hand-over in a drone network of claim 10, wherein the network information copying phase includes:
 a phase via which the GCS controls the substitute drone to allocate an arbitrary ID for peer-to-peer communications with the drone to be changed; and
 a phase via which the GCS controls the drone to be changed to communicate with the substitute drone using the arbitrary ID thus allocated.

12. The method for controlling hand-over in a drone network of claim 10, wherein, in the substitute drone transferring phase, the GCS verifies whether the drone to be changed can make a flight and, if the drone to be changed cannot make the flight, controls the drone to be changed to allocate in advance, before being replaced, the network information of the drone to be changed to the substitute drone.

13. The method for controlling hand-over in a drone network of claim 10, wherein the network information copying phase includes:
 a phase via which the GCS controls the drone to be changed to provide services without an interruption during the copying activities; and
 a phase via which the GCS controls the drone to be changed to store packets received and transmitted during the copying activities in a cache of the drone to be changed.

14. The method for controlling hand-over in a drone network of claim 13, wherein the network information copying phase further includes a phase via which the GCS controls the substitute drone, after the copying activities are completed, to receive the packets stored in the cache of the drone to be changed in order to restore messages lost or to retransmit the packets to an adjacent drone.

15. The method for controlling hand-over in a drone network of claim 10, wherein, in the network information copying phase, if the drone to be changed cannot copy the network information of the drone to be changed to the substitute drone, the GCS controls the network information of the drone to be changed stored in the GCS or in an adjacent drone to be transferred to the substitute drone.

16. The method for controlling hand-over in a drone network of claim 10, wherein, in the network information copying phase, if the GCS cannot copy the network information of the drone to be changed onto the substitute drone, the method for controlling hand-over in a drone network further includes:
 a phase via which the GCS generates a virtual routing table including the substitute drone;
 a phase via which the GCS, upon actual replacing of the drone to be changed with the substitute drone, changes the virtual routing table into an actual routing table; and
 a phase via which the GCS, upon the substitute drone thus replaced transmitting a control message of a formation routing protocol, calibrates and optimizes the actual routing table.

17. The method for controlling hand-over in a drone network of claim 16, wherein, in the virtual routing table generation phase, the virtual routing table is generated based on either a simulation or a mathematical model.

18. The method for controlling hand-over in a drone network of claim 16, wherein, in the virtual routing table generation phase, the substitute drone generates the virtual routing table by receiving, from the GCS, the information of the substitute drone thus replaced in order to generate the virtual routing table.

* * * * *